W. H. PHILLIPS.
Cranks.

No. 155,672. Patented Oct. 6, 1874.

WITNESSES:
A Bennerendorf
A. F. Terry

INVENTOR:
W. H. Phillips
BY Munn & Co
ATTORNEYS.

UNITED STATES PATENT OFFICE.

WILLIAM HENRY PHILLIPS, OF BRIDGETON, NEW JERSEY.

IMPROVEMENT IN CRANKS.

Specification forming part of Letters Patent No. 155,672, dated October 6, 1874; application filed August 22, 1874.

*To all whom it may concern:*

Be it known that I, WILLIAM H. PHILLIPS, of Bridgeton, in the county of Cumberland and State of New Jersey, have invented a new and useful Improvement in the Construction of Cranks, of which the following is a specification:

The invention is an improvement in the class of windlass and other hand cranks which are provided with means for connecting them loosely or fixedly with their shafts. The invention consists in the construction and arrangement of the two parts of the crank and the portion of the rotary shaft to which they are applied, as hereinafter described.

Figure 1:
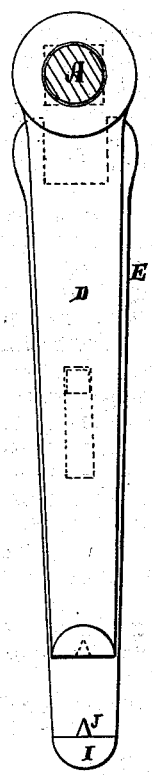
Figure 2:
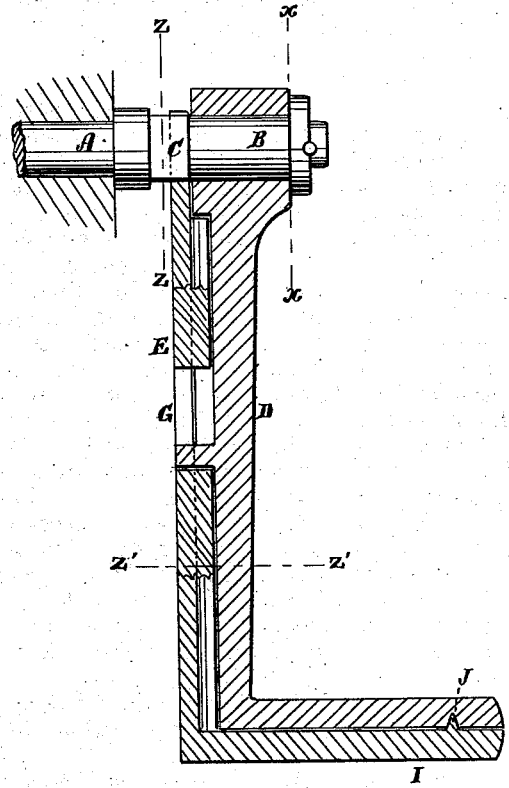
Figure 3:
Figure 4:

In the accompanying drawing, Figure 1 is a section looking from the line $x\ x$ of Fig. 2. Fig. 2 is a longitudinal section of Fig. 3, taken on the line $y\ y$. Fig. 3 is an inside view of the crank, looking to the right from the line $z\ z$ of Fig. 2. Fig. 4 is a cross-section of the crank, taken on the line $z'\ z'$ of Fig. 2.

Similar letters of reference indicate corresponding parts.

A is the shaft, to which the crank is attached. This is ordinarily the drum-shaft of a windlass used for elevating water or other material from wells or mines, but it may be a shaft for any other purpose. The end of this shaft is made to receive a round crank, as seen at B, and a square crank, as seen at C. The crank is made in two parts. One part, D, is fitted to the round portion of the shaft, and the other part, E, is made open, so as to fit on and inclose three sides of the square portion of the shaft C. The parts E and D are connected together by means of a dovetail and dovetail groove, as seen in Fig. 4, or in any suitable manner, so that the part E will readily slide on the part D sufficiently far to detach the open end from the square of the shaft. The motion of the part E is limited by the mortise G and the pin H. I is the crank-handle, which is also in two parts, one attached to part D, and the other to part E, each being a semicircle, and forming an entire round handle when the shaft is being turned for elevating. There may be a spring or springs between these two parts of the handle, or in the mortise, or employed in any other manner to force the two parts from each other when they are not grasped by the hand; but in this case the part E would be thrown by centrifugal force from the shaft, and consequently disengaged, thus rendering such spring or springs unnecessary. J is a steady-pin, to keep the two parts of the handle in place when they are in contact, as seen in Fig. 2. This crank may be used in perfect safety, as no serious accident can happen should the handle slip from the hand in elevating.

I do not claim a crank having a ratchet and spring pawl connection with a windlass-shaft; but,

Having thus described my invention, I claim as new, and desire to secure by Letters Patent—

The combination, with the shaft A, having the squared portion C and round portion B, of the part D of the crank, and the sliding part E, having an open slot in the upper end, and arm or handle I, all as shown and described, to operate as specified.

WILLIAM HENRY PHILLIPS.

Witnesses:
 DANIEL SHARP,
 H. G. CLEMENT.